(12) United States Patent
Glover et al.

(10) Patent No.: US 9,487,247 B2
(45) Date of Patent: Nov. 8, 2016

(54) CARGO BED EXTENDER

(71) Applicant: Deere & Company, Moline, IL (US)

(72) Inventors: Ryan Glover, Campbellsport, WI (US); Danney Dendy, Sullivan, IL (US)

(73) Assignee: DEERE & COMPANY, Moline, IL (US)

( * ) Notice: Subject to any disclaimer, the term of this patent is extended or adjusted under 35 U.S.C. 154(b) by 54 days.

(21) Appl. No.: 14/668,358

(22) Filed: Mar. 25, 2015

(65) Prior Publication Data

US 2016/0280286 A1 Sep. 29, 2016

(51) Int. Cl.
*B62D 33/033* (2006.01)
*B62D 33/077* (2006.01)
*B62D 33/027* (2006.01)

(52) U.S. Cl.
CPC ........... *B62D 33/033* (2013.01); *B62D 33/077* (2013.01); *B62D 33/0273* (2013.01)

(58) Field of Classification Search
CPC B62D 33/0273; B62D 33/033; B62D 3/037; B62D 3/077; B60P 3/40; B60P 7/0892
USPC ........................ 224/403; 296/26.11
See application file for complete search history.

(56) References Cited

U.S. PATENT DOCUMENTS

| | | | |
|---|---|---|---|
| 5,775,759 A * | 7/1998 | Cummins .......... | B62D 33/0273 296/26.11 |
| 5,924,753 A | 7/1999 | DiBassie | |
| 6,019,410 A | 2/2000 | Trostle et al. | |
| 6,120,076 A | 9/2000 | Adsit et al. | |
| 6,283,525 B1 | 9/2001 | Morse | |
| 6,340,190 B1 * | 1/2002 | Rosebrugh ................ | B60P 3/40 296/26.11 |
| 6,540,123 B1 * | 4/2003 | Kmita ..................... | B60R 5/041 224/403 |
| 6,908,134 B1 | 6/2005 | Summers | |
| 6,994,389 B1 * | 2/2006 | Graffy ...................... | B60P 3/40 296/26.08 |
| 7,007,995 B1 | 3/2006 | Scarberry et al. | |
| 7,063,366 B2 * | 6/2006 | Leitner .................... | B60P 3/40 224/404 |
| 7,111,886 B1 * | 9/2006 | Miller ...................... | B60P 3/40 296/26.11 |
| 7,121,604 B2 * | 10/2006 | Reed ......................... | B60P 3/40 296/26.11 |
| 7,182,380 B2 | 2/2007 | Nagle | |
| 7,207,615 B2 | 4/2007 | St. Romain | |
| 7,240,940 B2 * | 7/2007 | Leitner .............. | B62D 33/0273 296/26.11 |
| 7,347,473 B2 * | 3/2008 | Miller ...................... | B60P 3/40 296/26.1 |
| 7,488,021 B1 * | 2/2009 | Roos ........................ | B60P 3/40 296/26.11 |
| 7,681,935 B2 | 3/2010 | Lietner et al. | |
| 7,712,811 B2 | 5/2010 | Heaman et al. | |
| 7,770,956 B1 | 8/2010 | Summers | |
| 7,841,638 B2 * | 11/2010 | Smith ................ | B62D 33/0273 296/26.11 |
| 8,109,552 B2 * | 2/2012 | Nelson ............... | B62D 33/0273 224/403 |
| 8,146,786 B2 | 4/2012 | Cheung et al. | |
| 8,297,677 B2 | 10/2012 | Leitner et al. | |
| 2002/0153737 A1 * | 10/2002 | Fitts ......................... | B60P 3/40 296/26.11 |
| 2004/0080174 A1 * | 4/2004 | Buelna ............... | B62D 33/0273 296/26.11 |
| 2006/0033352 A1 * | 2/2006 | King ................... | B62D 33/0273 296/26.11 |
| 2007/0132263 A1 * | 6/2007 | Smith ....................... | B60R 9/00 296/37.6 |
| 2010/0026027 A1 * | 2/2010 | Gao ................... | B62D 33/0273 296/26.11 |
| 2013/0119693 A1 | 5/2013 | Leitner et al. | |
| 2014/0167439 A1 | 6/2014 | Sorensen | |

* cited by examiner

Primary Examiner — Corey Skurdal

(57) ABSTRACT

A cargo bed extender includes a pair of side mounting plates attached to a cargo bed sidewall, a center structure having a plurality of cross bars between a pair of end plates, and a pair of side structures with a plurality of cross bars between a front plate and a mast. Each side structure has a pivot rod engaging the side mounting plate, and a pair of spring biased feet, one of the feet extending from each end of the mast. Locking pins may be inserted through the front plate to engage the side mounting plate and hold the spring biased feet in a position where they exert forces against the tailgate or cargo bed floor.

15 Claims, 4 Drawing Sheets

CARGO BED EXTENDER

FIELD OF THE INVENTION

This invention relates generally to cargo bed extenders, and specifically to cargo bed extenders for off-road utility vehicles.

BACKGROUND OF THE INVENTION

Cargo bed extenders may be used on pick-up trucks to transport cargo that is longer than the cargo bed. The truck tailgate may be opened when the cargo bed extender is used. Off-road utility vehicles have smaller cargo boxes and may be driven over bumps and uneven terrain. As a result, when cargo bed extenders are used on off-road utility vehicles, they tend to rattle excessively and create undesirable noise. There is a need for a cargo bed extender for an off-road utility vehicle that reduces or eliminates rattle and noise during use. There also is a need for a cargo bed extender for an off-road utility vehicle that is low in cost, and that may be taken apart, stored or shipped in a small package or container.

SUMMARY OF THE INVENTION

A cargo bed extender includes a center structure attached between a pair of side structures that may be pivoted between an extended position on a tailgate and a stowed position on a cargo bed floor. Spring biased feet may extend from the side structures into contact with the tailgate in the extended position and into contact with the cargo bed floor in the stowed position. Locking pins may be inserted through the side structures and into side mounting plates in positions where the spring biased feet exert forces against the tailgate or the cargo bed floor.

DESCRIPTION OF THE PREFERRED EMBODIMENT

Figure 1:
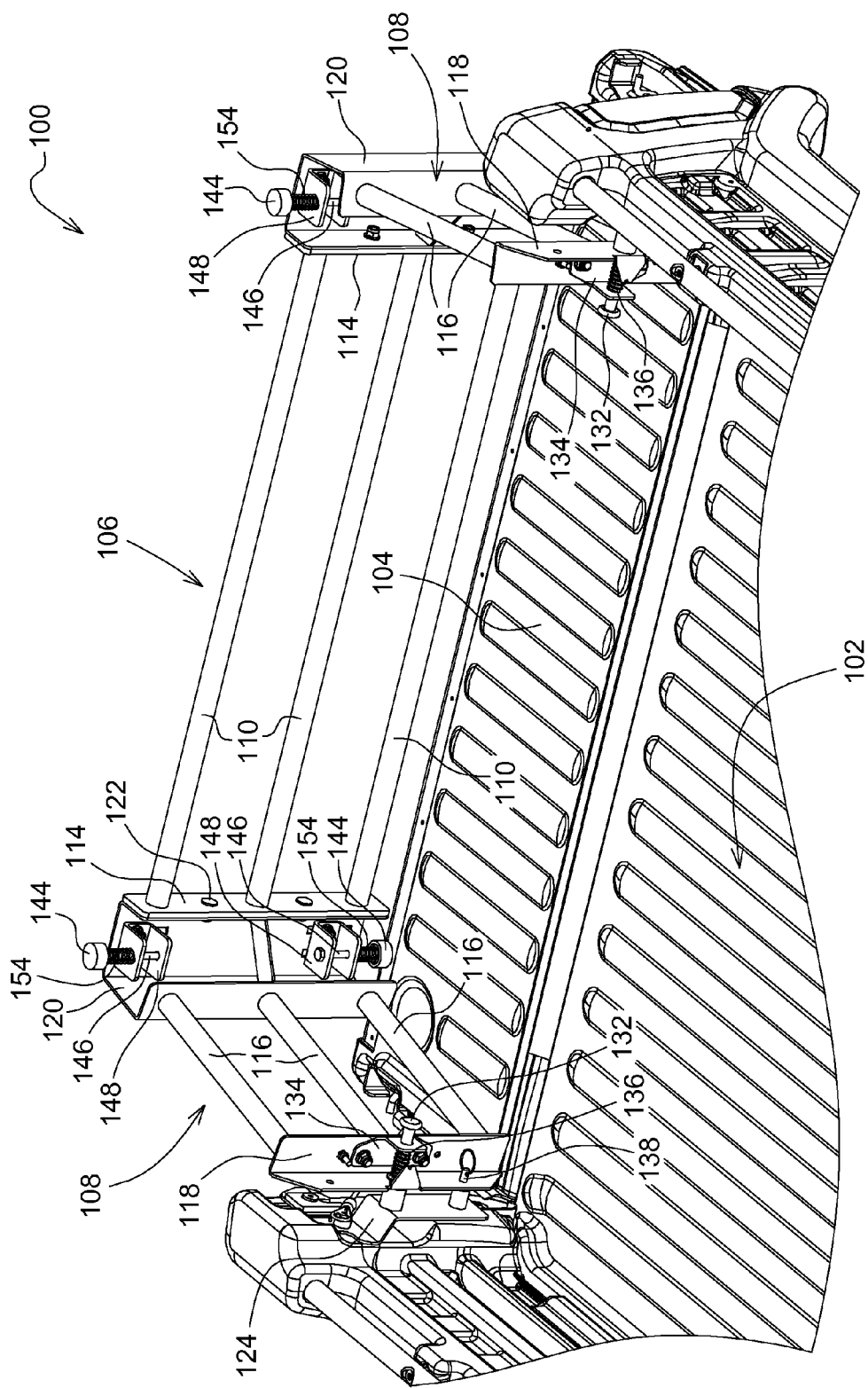
FIG. 1 is a perspective view of a cargo bed extender in the extended position on an off-road utility vehicle according to one embodiment of the invention.
Figure 2:
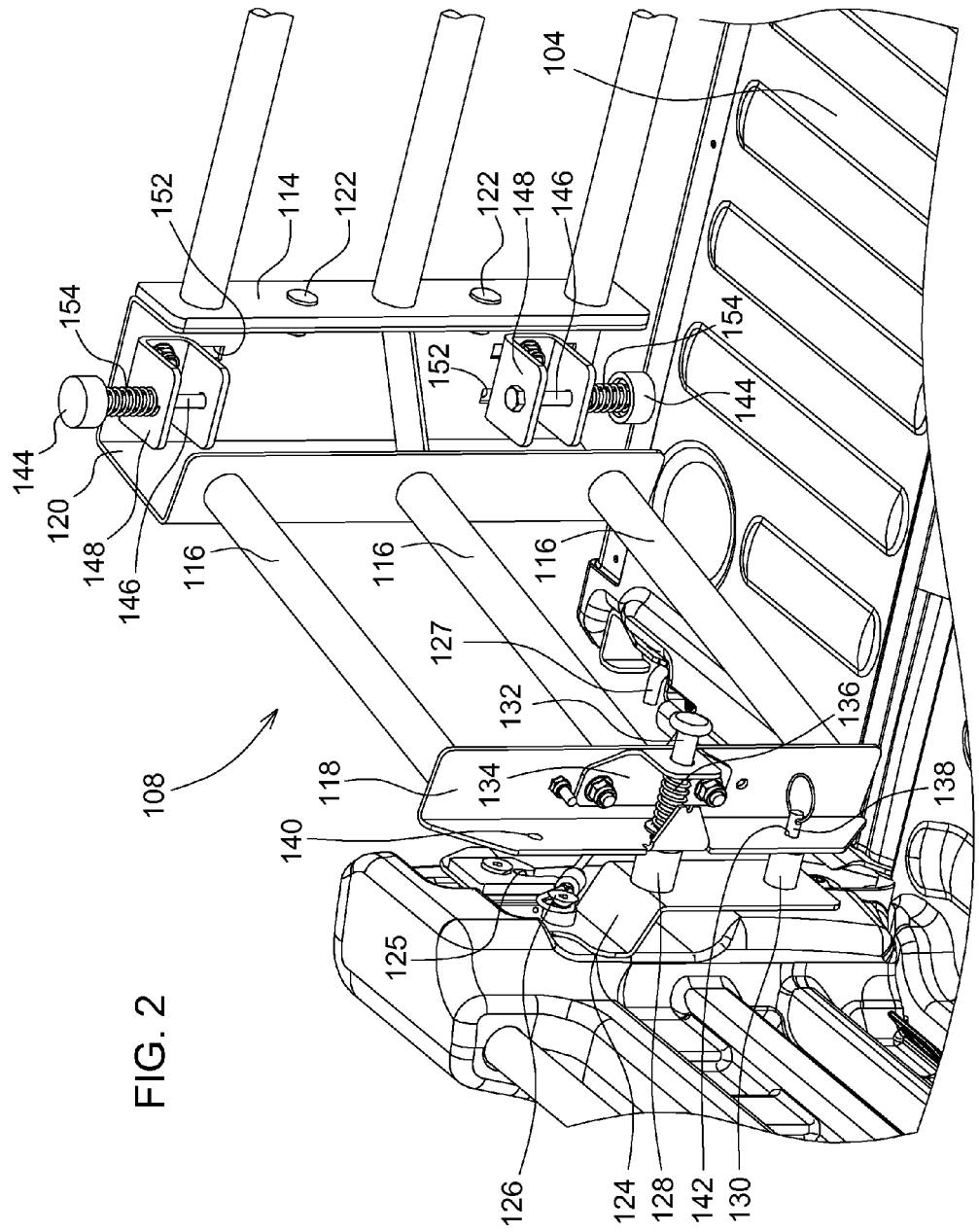
FIG. 2 is a perspective view of a side structure of the cargo bed extender in the extended position according to one embodiment of the invention.
Figure 3:
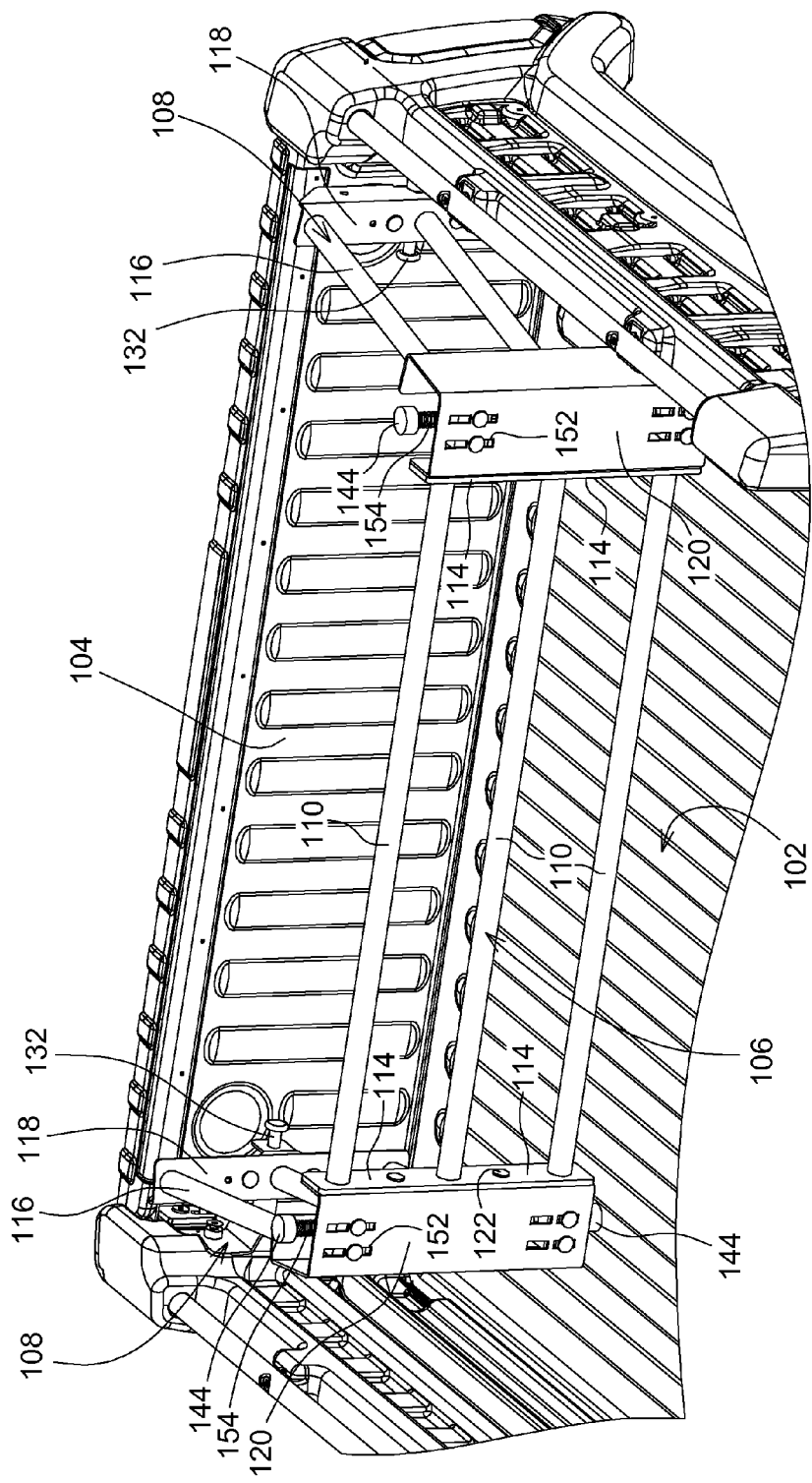
FIG. 3 is a perspective view of a cargo bed extender in the stowed position on an off-road utility vehicle according to one embodiment of the invention.
Figure 4:
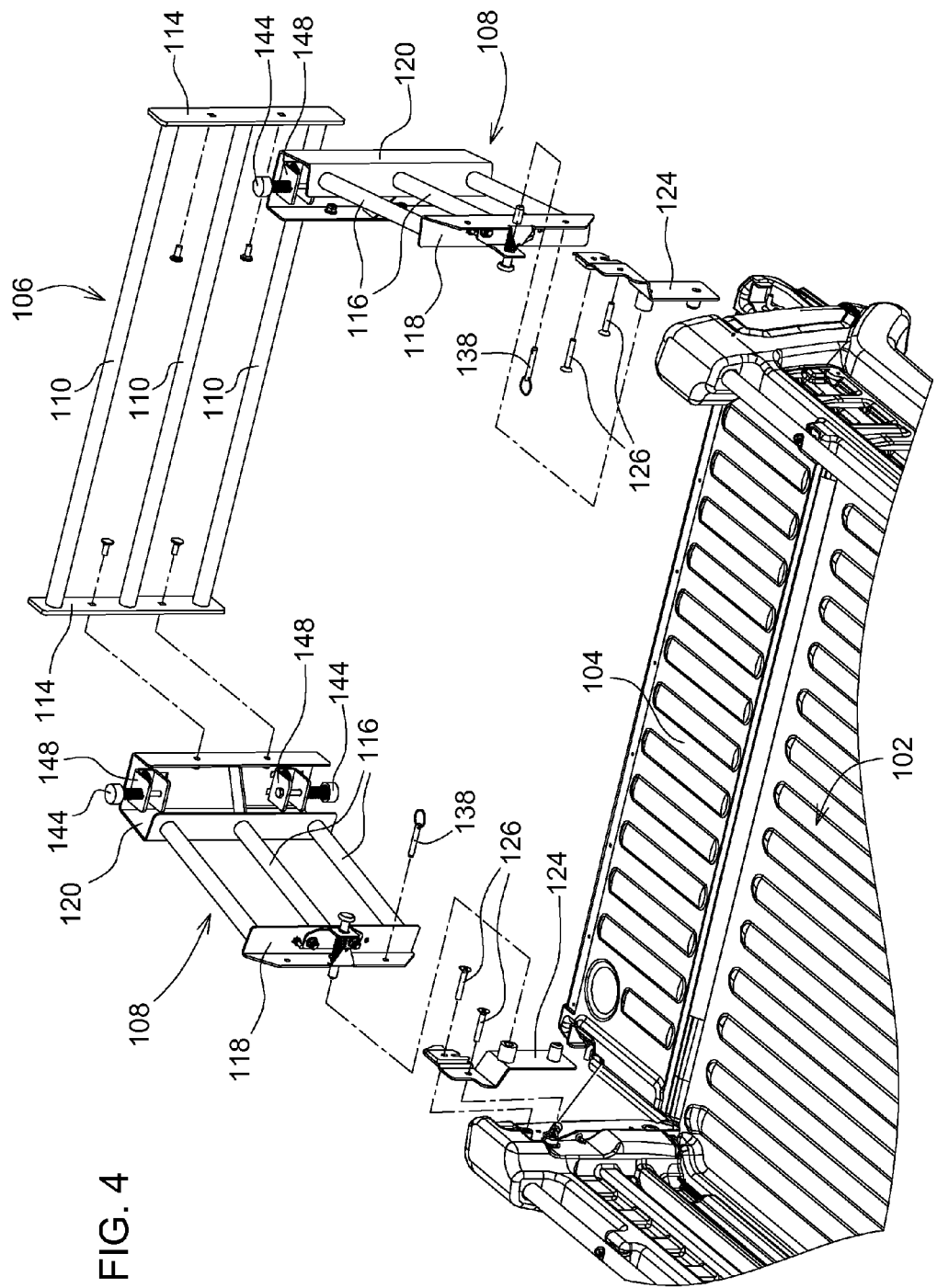
FIG. 4 is an exploded perspective view of a cargo bed extender for an off-road utility vehicle according to one embodiment of the invention.

As shown in FIGS. 1-4, cargo bed extender 100 may be mounted to cargo bed 102 of an off-road utility vehicle. The cargo bed extender may be used in an extended position with tailgate 104 open, or rotated 180 degrees to a stowed position inside the cargo bed with the tailgate closed.

In one embodiment, cargo bed extender 100 may include center structure 106 and a pair of side structures 108. The center structure may include a plurality of straight horizontal steel tubes or cross bars 110 welded or otherwise secured between a pair of sheet metal end plates 114.

In one embodiment, each side structure may include a plurality of straight horizontal steel tubes or cross bars 116. A forward end of each tube or cross bar may be welded or otherwise secured to sheet metal front plate 118. Each front plate may be folded at about 90 degrees to form two vertical panels. A rearward end of each tube or cross bar may be welded or otherwise secured to sheet metal mast 120. Each mast may have a first end and a second end, and may be folded at three 90 degree angles to form a box-like member with four generally vertical panels and having a corner opening or gap between two of the panels. One of the panels may be attached to end plate 114 using threaded fasteners 122. The threaded fasteners may be inserted through holes in each mast and end plate to secure the center structure to each side structure. The threaded fasteners may be removed such that the center structure and side structures may be stored or shipped separately or stacked together in relatively small and substantially flat containers or packaging.

In one embodiment, cargo bed extender 100 may include a pair of side mounting plates 124. The side mounting plates may be attached to the opposing side walls of the cargo box using threaded fasteners 126. Each side mounting plate may include latching mechanism 125 that may be engaged by rod 127 when the tailgate is closed. The threaded fasteners may be inserted into and assembled to existing holes in the side walls of the cargo bed so that latching mechanism 125 on the side mounting plate may replace the standard latching mechanism for the tailgate. Each side mounting plate also may include a first sleeve or receptacle 128 and a second sleeve or receptacle 130, each sleeve or receptacle extending from the mounting plate toward the interior of cargo bed 102.

In one embodiment, cargo bed extender 100 may include pivot pins 132 that extend out from the cargo bed extender toward the cargo box side walls and side mounting plates. The pivot pins may engage the cargo bed side wall or side mounting plates to provide a horizontal axis for pivoting the cargo bed extender. For example, each pivot pin may be inserted into the first sleeve or receptacle 128. Each pivot pin may be mounted to bracket 134 attached to front plate 118. A coil spring 136 may be positioned around each pivot pin 132. An operator may retract the pivot pin to compress the coil spring before inserting the pivot pin into the first sleeve or receptacle 128 to install the cargo bed extender on the cargo bed of the off-road utility vehicle.

In one embodiment, cargo bed extender 100 may include locking pins 138 that may be used to secure and lock the cargo bed extender in either the stowed position or in the extended position. The locking pins may be inserted through the side structures to engage the cargo bed side wall or the side mounting plates to hold the cargo bed extender in place. For example, an operator may insert each locking pin through one of holes 140, 142 in front plate 118, and then into second sleeve or receptacle 130 to lock the cargo bed extender in the desired position.

In one embodiment, cargo bed extender 100 may include spring biased feet 144 extending vertically from each end of mast 120. The spring biased feet may contact the tailgate in the extended position or the cargo bed floor in the stowed position. Additionally, locking pins 138 may engage the side mounting plates in positions causing each spring biased foot 144 to exert a downward force against the tailgate or cargo bed floor. The locking pins may keep the springs compressed such that the spring biased feet exert forces against the tailgate or cargo bed floor. As a result, the spring biased feet, in combination with the locking pins, reduce or eliminate any rattle or noise from the cargo bed extender.

In one embodiment, the end of each spring biased foot 144 may be rubber or other resilient material attached to rod 146. The rod may be slideably mounted in bracket 148 which may be attached to the inside of the box-like structure of mast 120. For example, threaded fasteners 150 may be used to attach each bracket 148 to slots 152 in one of the panels of the mast. The operator may loosen or remove the threaded fasteners and slide the bracket up or down within the slots to different vertical positions to change the position of the spring biased feet relative to the end of the mast. Compression coil spring 154 may be positioned around each rod 146 and in contact with the end of the spring biased foot. After the cargo bed extender is resting on two of the spring biased feet in contact with the cargo bed floor in the stowed position or the tailgate in the extended position, the operator then may push down the cargo bed extender. This compresses both coil springs 154, so that the operator then may insert locking pins 138 into engagement with the side mounting plates or side wall. For example, the operator may insert locking pins 138 through holes 140 or 142 and into sleeve or receptacle 130. As a result, the spring biased feet continue to exert forces against the tailgate or cargo bed floor, and also continue to exert forces acting on each locking pin 138 to hold the locking pin in place in sleeve or receptacle 130. It is preferred that spring biased feet 144 are mounted to and extend from the ends of each mast, but in an alternative embodiment may be mounted to and extend from part of the center structure.

Having described a preferred embodiment, it will become apparent that various modifications can be made without departing from the scope of the invention as defined in the accompanying claims.

The invention claimed is:

1. A cargo bed extender, comprising:
a pair of side mounting plates, each side mounting plate attached to a cargo bed sidewall;
a center structure having a plurality of cross bars between a pair of end plates;
a pair of side structures, each side structure having a pivot rod engaging the side mounting plate, and having a plurality of cross bars between a front plate and a mast; each mast attached to one of the end plates and having a first end and a second end;
a pair of spring biased feet, one of the feet extending from each end of the mast; and
a pair of locking pins, each locking pin inserted through a hole in the front plate and engaging the side mounting plate.

2. The cargo bed extender of claim 1 further comprising a first and a second sleeve extending from each side mounting plate, the pivot pin and the locking pin each inserted into one of the sleeves.

3. The cargo bed extender of claim 1 wherein each mast is folded into four vertical panels to form a box-like member.

4. The cargo bed extender of claim 1 wherein the spring biased feet are in contact with a cargo bed floor or a tailgate to provide forces acting on the pair of locking pins.

5. The cargo bed extender of claim 1 wherein each of the spring biased feet are slideably mounted to a bracket that can slide up or down within a plurality of slots in the mast to a plurality of different vertical positions to change the position of the spring biased feet relative to the mast.

6. The cargo bed extender of claim 1 wherein each of the side mounting plates includes a latching mechanism for a tailgate.

7. A cargo bed extender, comprising:
a center structure attached between a pair of side structures and being pivotable between an extended position on a tailgate and a stowed position on a cargo bed floor;
a plurality of spring biased feet extending from the side structures into contact with the tailgate in the extended position and into contact with the cargo bed floor in the stowed position; and
a plurality of locking pins insertable through the side structures and into a pair of side mounting plates in positions where the spring biased feet exert forces against the tailgate or the cargo bed floor.

8. The cargo bed extender of claim 7 further comprising a mast at an end of each side structure, each of the spring biased feet extending from an end of the mast.

9. The cargo bed extender of claim 7 further comprising a plurality of steel tubes on the center structure and each side structure.

10. The cargo bed extender of claim 7 wherein the spring biased feet are adjustably mounted to the side structures.

11. The cargo bed extender of claim 7 further comprising a pivot pin mounted to each side structure and engaging the side mounting plate.

12. A cargo bed extender, comprising:
a center structure and a pair of side structures; each of the center structure and side structures having straight crossbars extending between sheet metal plates;
each of the sheet metal plates of the side structures including a plurality of panels; one of the panels attached to the plate at the end of the center structure; and
a plurality of spring biased feet mounted to one of the panels, at least one of the spring biased feet extending upwardly and at least another one of the spring biased feet extending downwardly from the panel; the spring biased feet exerting forces against a tailgate or a cargo bed floor while a locking pin through one of the panels engages a cargo bed side wall.

13. The cargo bed extender of claim 12 further comprising a pair of pivot pins extending through one of the panels to the cargo bed sidewall.

14. The cargo bed extender of claim 12 wherein one of the sheet metal plates of the side structures includes four panels folded to provide a box-like member with a corner opening, and one of the spring biased feet is mounted in the box-like member.

15. The cargo bed extender of claim 12 wherein the spring biased feet are adjustably mounted to slots in one of the panels.

* * * * *